(12) United States Patent
Yao et al.

(10) Patent No.: US 9,191,815 B2
(45) Date of Patent: Nov. 17, 2015

(54) NETWORK LOCKING METHOD AND DEVICE FOR MOBILE TERMINAL

(75) Inventors: Xiaofeng Yao, Shenzhen (CN); Cuirong Huang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 178 days.

(21) Appl. No.: 14/004,688

(22) PCT Filed: Jun. 21, 2011

(86) PCT No.: PCT/CN2011/076058
§ 371 (c)(1),
(2), (4) Date: Sep. 12, 2013

(87) PCT Pub. No.: WO2012/122753
PCT Pub. Date: Sep. 20, 2012

(65) Prior Publication Data
US 2014/0004831 A1    Jan. 2, 2014

(30) Foreign Application Priority Data
Mar. 14, 2011 (CN) .......................... 2011 1 0060786

(51) Int. Cl.
*H04M 1/66* (2006.01)
*H04W 12/06* (2009.01)
*H04W 8/18* (2009.01)
*H04W 12/10* (2009.01)
*H04M 1/67* (2006.01)

(52) U.S. Cl.
CPC ................ *H04W 12/06* (2013.01); *H04W 8/18* (2013.01); *H04W 8/183* (2013.01); *H04M 1/67* (2013.01); *H04W 12/10* (2013.01)

(58) Field of Classification Search
CPC ....... H04M 1/66; H04M 1/663; H04M 1/665; H04M 1/667
USPC .......................................... 455/411; 370/338
See application file for complete search history.

(56) References Cited

U.S. PATENT DOCUMENTS 6,321,079 B1 * 11/2001 Cooper .......................... 455/411
2005/0075092 A1 *  4/2005 Kim ............................. 455/411
(Continued)

FOREIGN PATENT DOCUMENTS

| CN | 101409949 A | 4/2009 |
| CN | 101707645 A | 5/2010 |

(Continued)

OTHER PUBLICATIONS

International Search Report for PCT/CN2011/076058 dated Nov. 29, 2011.

(Continued)

*Primary Examiner* — Marcos Batista
(74) *Attorney, Agent, or Firm* — Ling Wu; Stephen Yang; Ling and Yang Intellectual Property

(57) ABSTRACT

A network locking method and device for a mobile terminal are provided in the present document, wherein network locking information and verification signals of a mobile terminal and a subscriber identify module (SIM) card are respectively stored in both parties in advance; after the mobile terminal is powered on, the mobile terminal and the SIM card verify each other through the verification signals; if the both parties pass through the verification performed by the other party, the mobile terminal compares the stored network locking information with the network locking information in the SIM card; if the comparison result indicates consistency, the mobile terminal enters into a normal standby state.

8 Claims, 4 Drawing Sheets

(56) References Cited

U.S. PATENT DOCUMENTS

2007/0094507 A1* 4/2007 Rush .................. 713/176
2008/0003980 A1   1/2008 Voss et al.

FOREIGN PATENT DOCUMENTS

| CN | 101860850 A  | 10/2010 |
|----|--------------|---------|
| EP | 1441552 A1   | 7/2004  |
| WO | 2005051018 A1| 6/2005  |
| WO | 2006048051 A1| 5/2006  |

OTHER PUBLICATIONS

"Digital cellular telecommunications system"; Personalisation of GSM Mobile Equipment(ME); Mobile functionality specification; GSM 02.22 version 7.0.0 Release 1998; ETSI TS 101 624 V7.0.0; Aug. 1999; XP14006500A; see pp. 1-23.

* cited by examiner

NETWORK LOCKING METHOD AND DEVICE FOR MOBILE TERMINAL

TECHNICAL FIELD

The present document relates to network locking technology in the field of mobile communication, and more particularly, to a network locking method and device for mobile terminal.

BACKGROUND OF THE RELATED ART

Currently, many mobile terminal manufacturers cooperate with mobile operators to develop appropriate customized mobile terminals for operators, and the operators gain market shares by presenting mobile terminals as gifts. This requires that the customized mobile terminals have network locking function, and ensures the users of the customized mobile terminals can only use the services provided by the operator. Afterwards, the operator returns a portion of the acquired profits back to the mobile terminal manufacturers to ensure that the interests of the mobile terminal manufacturers. It can be seen that, in the process of achieving the interests of both parties, the network locking mechanism is an important step, and its security is essential, only if the network locking information remains in effect, can the interests of the operators and the manufacturers be guaranteed.

However, many hackers, in order to reap illegal profits, study the security vulnerabilities existing in the current network locking mechanisms and use these vulnerabilities to crack the network locking mechanism, the cracked and customized mobile terminal can use services provided by other operators. These hackers are paid to illegally crack the customized mobile terminals for the users in order to seek their own interests, and this seriously damages the legitimate rights and interests of the operators and the mobile device manufacturers.

In order to maintain the legitimate rights and interests of the operators and the mobile terminal manufacturers, it not only needs to obtain protection from the legal aspects, but also needs to upgrade the network locking technology to enhance the product competitiveness and user satisfaction of the mobile terminals. The existing network locking method is typically as follows: pre-store the encrypted subscriber identity module (SIM) card information, such as mobile country code (MCC) and Mobile Network Code (MNC), in the mobile terminal; when the mobile terminal is powered on each time, verify the MCC and MNC in the SIM card, namely, compare the stored MCC and MNC with the MCC and MNC in the SIM card inserted in the mobile terminal, if there is a verification error, the mobile terminal cannot work properly, so as to achieve the network locking function of the mobile terminal. It can be seen that, the existing network locking method only designs the network locking scheme at the side of the mobile terminal, that is, the existing solution only optimizes the design of the software or hardware of the mobile terminal, so as to improve the security of the network locking mechanism. However, the mobile terminal can only verify whether the SIM card is a customized SIM card or not, while the SIM card cannot judge whether the mobile terminal in which the SIM card is inserted is a customized mobile terminal or not, that is, they can not verify each other, so that the customized SIM card can also be used even if it is inserted into a non-customized mobile terminal, thus deteriorating legitimate rights and interests of the operators and the mobile terminal manufacturers.

SUMMARY OF THE INVENTION

In view of this, the main purpose of the present document is to provide a network locking method and device for a mobile terminal, so that the mobile terminal and a subscriber identity module (SIM) card can verify each other, thereby improving the security of existing network locking mechanisms of the mobile terminal.

To achieve the above-mentioned purpose, the technical solution of the present document is achieved as:

the present document provides a network locking method for a mobile terminal, wherein network locking information and verification signals of the mobile terminal and the SIM card are stored respectively in both parties in advance; the method further comprises:

after the mobile terminal is powered on, the mobile terminal and the SIM card verifying each other through the verification signals, if both parties pass through the verification performed by the other party, the mobile terminal comparing the stored network locking information with the network locking information in the SIM card, and if the comparison result indicates consistency, the mobile terminal enters into a normal standby state.

Wherein, verification signals stored in the mobile terminal are verification signals C1 and C2; verification signals correspondingly stored in the SIM card are verification signals S1 and S2.

Wherein, the mobile terminal and the SIM card verifying each other is:

the mobile terminal actively sending the verification signal C1 to the SIM card, after the SIM card receives the verification signal C1, the SIM card returning the verification signal S1 to the mobile terminal, and only if the mobile terminal receives the verification signal S1, the mobile terminal continuing to send the verification signal C2 to the SIM card; otherwise, it being indicated that the SIM card is not legal and does not pass the verification performed by the mobile terminal;

after the SIM card receives the verification signal C2, the SIM card returning the verification signal S2 to the mobile terminal, and returning its own stored network locking information back; the mobile terminal first judging whether the received verification signal S2 is correct or not, if correct, it being indicated that the both parties pass through the verification performed by the other party; otherwise, it being indicated that the verification process of both parties fails.

In the above-mentioned solution, the network locking information comprises: network locking flag, as well as network locking Mobile Country Code (MCC) and Mobile Network Code (MNC).

Wherein, the mobile terminal and the SIM card comparing their network locking information is:

the mobile terminal first judging whether the network locking flag of the SIM card is consistent with its own stored network locking flag or not, and if inconsistent, it is indicated that the mobile terminal is unavailable; otherwise, the mobile terminal judging whether the network locking MCC and MNC of the SIM card are consistent with its own stored network locking MCC and MNC respectively or not; if consistent, the mobile terminal entering into the normal standby mode; otherwise, it is indicated that the mobile terminal is not available.

Wherein, the network locking flag comprises: active state, unlocking success state and locking state.

The present document also provides a network locking device for mobile terminal, and the device comprises: a mobile terminal and a subscriber identity module (SIM) card; wherein the mobile terminal is used to store network locking information as well as verification signals for performing the verification operation with the SIM card; after the mobile terminal is powered on, verify with the SIM card each other through the verification signals, and if it is determined that both parties pass through the verification performed by the other party, compare the stored network locking information with that in the SIM card, and if it is determined that the comparison result indicates consistency, enter into a normal standby state;

the SIM card is used to store the network locking information and the verification signal for performing the verification operation with the mobile terminal; after the mobile terminal is powered on, verify with the mobile terminal each other through the verification signals.

The present document also provides a mobile terminal, comprising: a storage module, a verification module and a comparison module; wherein, the storage module is used to store the network locking information and the verification signals for performing the verification operation with the SIM card;

the verification module is used to, after the mobile terminal is powered on, verify with the SIM card each other through the verification signals stored in the storage module, if it is determined that the both parties pass through the verification performed by the other party, notify the comparison module;

the comparison module is used to, after receiving the notification from the verification module, compare the network locking information stored in the storage module with that in the SIM card, when it is determined that the comparison result indicates consistency, make the mobile terminal enter into the normal standby state.

The present document also provides a SIM card, and the SIM card is used to store network locking information and verification signals for performing verification operation with a mobile terminal;

after the mobile terminal is powered on, the SIM card is used to verify with the mobile terminal each other through the verification signals.

With respect to the network locking method and device for the mobile terminal provided in the present document, the network locking information and the verification signals of the mobile terminal and the SIM card are respectively stored into the both parties in advance; after the mobile terminal is powered on, the mobile terminal and the SIM card verify each other through the verification signals, if the both parties pass through the verification performed by the other party, the mobile terminal compares the stored network locking information with that in the SIM card, and if the comparison result indicates consistency, the mobile terminal enters into the normal standby state. In the present document, since, before the SIM card becomes into use, not only the network locking information including the existing MCC and MNC but also the verification signals are stored, the verification process performed by the mobile terminal and the SIM card through the verification signals can guarantee that: the customized mobile terminal cannot be used if another non-customized SIM card is inserted, meanwhile, the customized SIM card can not be used if it is inserted into another mobile terminal. Compared with the prior art, even if the MCC and MNC in the mobile terminal are cracked, if a non-customized SIM card is inserted, since the non-customized SIM card can not perform the verification operation with the mobile terminal, the non-customized SIM card still cannot be recognized and used, thereby improving the security of the existing network locking mechanism.

In addition, in the present document, a network locking flag is also set in the network locking information, which not only improves the security of the network locking information comparison process, but also is convenient for the unlocking operation by the related legitimate personnel such as the operator.

PREFERRED EMBODIMENTS OF THE INVENTION

The basic idea of the present document is: network locking information and verification signals of the mobile terminal and the SIM card are respectively stored in the both parties in advance; after the mobile terminal is powered on, the mobile terminal and the SIM card verify each other through the verification signals, and if the both parties pass through the verification performed by the other party, the mobile terminal compares the stored network locking information with that in the SIM card, and if the comparison result indicates consistency, the mobile terminal enters into the normal standby state; otherwise, the mobile terminal is not available.

Wherein, if the verification process performed by the mobile terminal and the SIM card fails, the mobile terminal identifies the SIM card as an illegal card, and does not perform subsequent comparison operation any longer.

In the following, in combination with the accompanying drawings and specific embodiments, the present document will be described in further detail.

Figure 1:
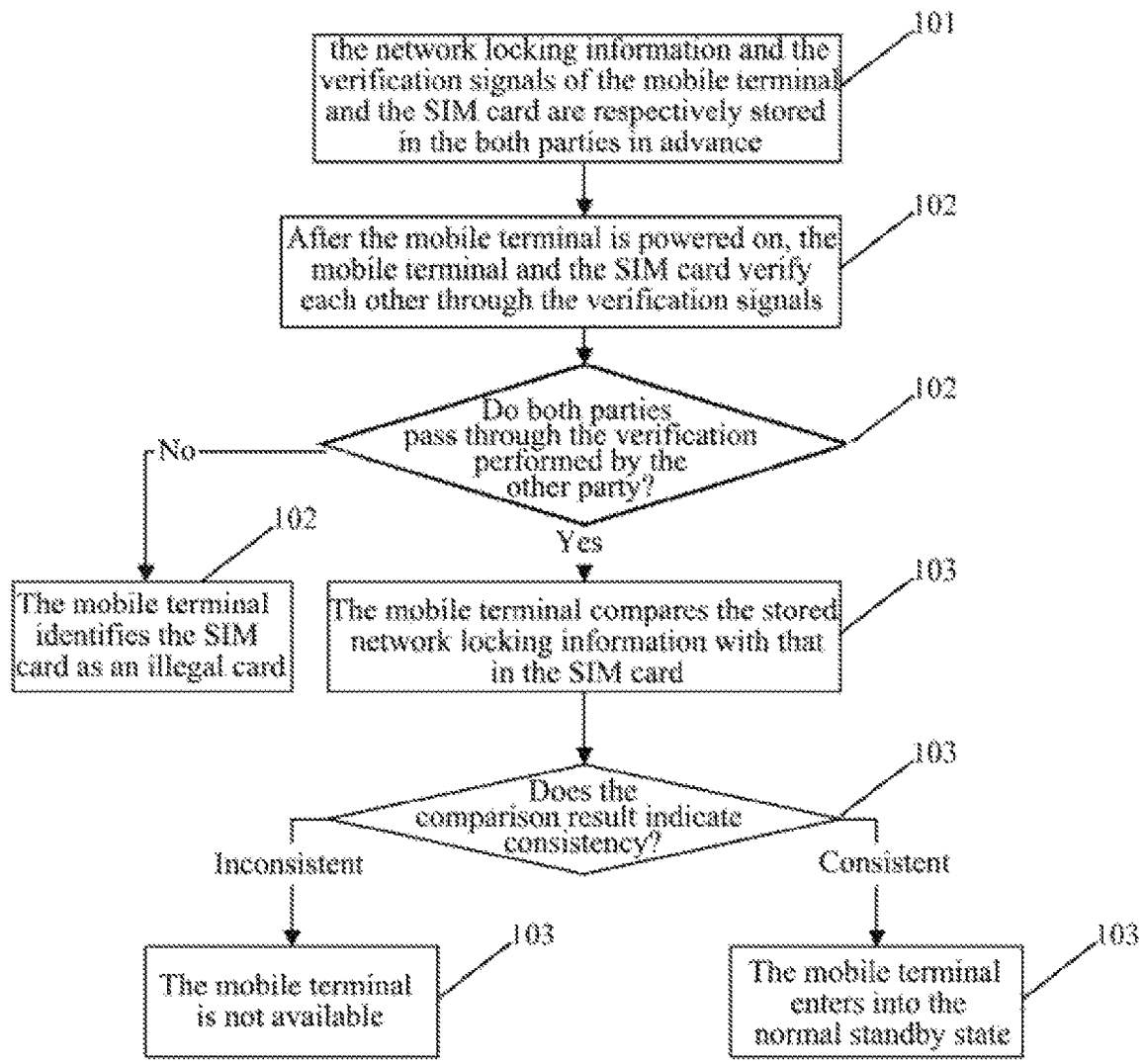
FIG. 1 is a flow chart of a network locking method for a mobile terminal in accordance with the present document.

FIG. 1 is a flow chart of implementing a network locking method for the mobile terminal in accordance with the present document, and as shown in FIG. 1, the process comprises the following steps:

In step 101, the network locking information and the verification signals of the mobile terminal and the SIM card are respectively stored in the both parties in advance;

Specifically, the mobile terminal manufacturer can cooperate with the mobile operator, and before the customized mobile terminal and the customized SIM card are put into use, the network locking information specified by the mobile operator is pre-stored into the mobile terminal and the SIM card, so as to reflect the network locking requirement of the mobile operator.

Wherein, the network locking information comprises: the network locking flag, as well as the network locking MCC and MNC; the network locking flag may be used to indicate the three network locking states, respectively: active state, unlocking success state and locking state, and the values of the network locking flags corresponding to the three network locking states can be expressed as: 0, 1 and 2. The network locking flag is defaulted to be active, that is, the mobile terminal and the SIM card are in the network locking state, and the value of the network locking flag is represented as 0; the network locking flag only changes when the network is unlocked, and after the unlocking is successful, the mobile terminal sets the values of the network locking flags stored in itself and the SIM card to 1; when they are unlocked, if the wrong unlocking code is entered too many times and the limited maximum number is exceeded, the values of the network locking flags in the mobile terminal and the SIM card are set to 2, and the unlocking operation cannot be performed, thus preventing brute cracking of hackers. The mobile terminal which is in the locking state cannot be identified when any SIM card is inserted, and the SIM card that is in the locking state is also not able to work when it is inserted into any mobile terminal.

Herein, the network locking information pre-stored in the customized mobile terminal and the network locking information pre-stored in the customized SIM card are the same, that is, the network locking flags correspondingly are the same, so as the network locking MCC and MNC.

Meanwhile, the verification signals of the mobile terminal and the SIM card also need to be stored in the both parties, in particular:

two verification signals C1 and C2 are stored in the mobile terminal, and the corresponding verification signals S1 and S2 are pre-stored in the SIM card. After the mobile terminal is powered on, it firstly sends the verification signal C1 to the SIM card, and after the SIM card receives the verification signal C1, it begins to work normally and returns the verification signal S1; otherwise, if the SIM card does not receive the verification signal C1, the SIM card does not work; and after the mobile terminal receives the verification signal S1, it sends the verification signal C2 to the SIM card, the SIM card correspondingly returns the verification signal S2, so as to achieve the purpose of verification, and the verification process about how the mobile terminal and the SIM card verify each other through the verification signals will be described in detail in step 102 and is not described here.

In the present document, the network locking information and the verification signal S2 in the SIM card are all stored in the same file, if the file fails to be read or the file is illegally cracked, errors would occur in both the network locking information and the verification signal S2. The file can be called as a network locking file.

In Step 102, after the mobile terminal is powered on, the mobile terminal and the SIM card verify each other through the verification signals, and if the both parties pass through the verification performed by the other party, it is to proceed to step 103; otherwise, the mobile terminal identifies the SIM card as an illegal card;

Specifically, after the mobile terminal is powered on, it actively sends the verification signal C1 to the SIM card, after the SIM card receives the verification signal C1, it returns the verification signal S1 to the mobile terminal, and only after the mobile terminal receives the verification signal S1, does the subsequent process continue, that is, it continues to send the verification signal C2 to the SIM card; otherwise, if the mobile terminal does not receive the verification signal S1, it is indicated that the SIM card is not illegal, and the SIM card does not pass the verification performed by the mobile terminal, the mobile terminal cannot idnetify the SIM card, and the mobile terminal can not communicate.

After the mobile terminal receives the verification signal S1, it sends the verification signal C2 to the SIM card, and the verification signal indicates that the mobile terminal will acquire the network locking information, namely, the network locking flag as well as the network locking MCC and MNC, stored in the SIM card; after the SIM card receives the verification signal C2, it returns the verification signal S2 to confirm that the verification signal C2 is received, meanwhile, it returns the network locking information stored in the SIM card. After the mobile terminal receives the verification signal S2 and the network locking information returned by the SIM card, according to the verification signal S2 returned by the SIM card, it determines whether the subsequent comparison operation would be performed or not, that is, the mobile terminal first judges whether the verification signal S2 returned by the SIM card is correct or not, and if the verification signal S2 is correct, it is indicated that the mobile terminal and the SIM card pass through the verification performed by the other party, and it is to proceed to step 103; if the verification signal S2 is not correct, the mobile terminal identifies the SIM card as an illegal card, and displays "SIM card not inserted" or "illegal SIM card", and so on, on the mobile terminal interface.

Herein, since the verification signal S2 and the network locking information in the SIM card are stored in the same file, if the file fails to be read or if the file is unlawfully destructed, the verification signal S2 and the network locking information will be destroyed, therefore, if the verification signal S2 is determined as correct, it is to continue the subsequent comparison operation; otherwise, it is indicated that the network locking information may be destroyed, and the mobile terminal identifies the SIM card as an illegal card.

Hereinafter, the four verification signals proposed by the present document will be described in detail.

The verification signals C1 and C2, and the verification signals S1 and S2 are customized signals, and each of which has a corresponding meaning, which will be described as follows:

the verification signal C1 is a signal sent from the mobile terminal to the SIM card, which has two meanings: 1) indicating that the mobile terminal requests the SIM card to return the verification signal S1, and the mobile terminal waits for the verification signal S1 to be returned, after the SIM card receives the verification signal C1, the SIM card searches for the corresponding verification signal S1 in the SIM card according to the verification signal C1 and sends it to the mobile terminal; 2) the verification signal C1 is the start-up signal of the SIM card, and because the SIM card is a customized SIM card, only the verification signal is received can the C1 begin to work, otherwise, the SIM card does not work.

The verification signal S1 is a signal returned by the SIM card to the mobile terminal, which has two meanings: 1) the SIM card proves to the mobile terminal that it is a customized SIM card, and conforms with the network locking requirement, and if the verification signal C1 is normally received, the function of the SIM card is activated; 2) the mobile terminal is informed that it should continue the subsequent process, that is, sending the verification signal C2.

The verification signal C2 is a signal sent by the mobile terminal to the SIM card, it indicates that the mobile terminal requires to acquire the network locking information in the SIM card, comprising: the network locking MCC and MNC, the network locking flag, and other network locking information.

The verification signal S2 is a signal returned by the SIM card to the mobile terminal, it has three meanings: 1) the SIM card receives the proper verification signal C2, and normally accesses to the network locking file stored on the SIM card; 2) the network locking file is not corrupted or erased; 3) the verification signal comparison process ends, and the mobile terminal can continue to perform the subsequent process.

The verification signal C1 corresponds to the verification signal S1, ensuring that the SIM card and the mobile terminal that are in use are customized in the present document, excluding the possibility of using other types of SIM cards or mobile terminals to operate. Therefore, it can effectively prevent the hackers from using the unlawful deception of "intermediary" to disguise an illegal SIM card as a legal one, this is because that the illegal SIM card cannot return the verification signal S1 to the mobile terminal.

The comparison process of the verification signals C2 and S2 ensures that the network locking information in the mobile terminal or the SIM card is not cracked individually, otherwise, the comparison process of the network locking information in the mobile terminal and the SIM card must fail in the subsequent process, causing that the mobile terminal cannot work normally. Therefore, it can effectively prevent the hackers from using software defects to attack and destroy the network locking information in the mobile terminal. Furthermore, the comparison operation of the network locking information in the mobile terminal and the SIM card can also prevent the mobile terminal and the SIM card whose network locking flags are inconsistent from working cooperatively, for example: it will be abnormal when an unlocked SIM card is inserted into the mobile terminal that is unlocked successfully, and the mobile terminal still cannot work normally.

It can be seen that, the use of the verification signals in the present document can guarantee that: if the user uses a customized mobile terminal, if another non-customized SIM card is inserted in, the mobile terminal cannot be used, even if a small chip card disguises as a legal card to attack, this is because the mobile terminal does not receive the verification signal S1, and it cannot continue the subsequent process; meanwhile, the customized SIM card cannot be inserted into an non-customized mobile terminal to be used, and since the SIM card does not receive the verification signal C1 sent by the mobile terminal, the SIM card cannot work.

Figure 2:
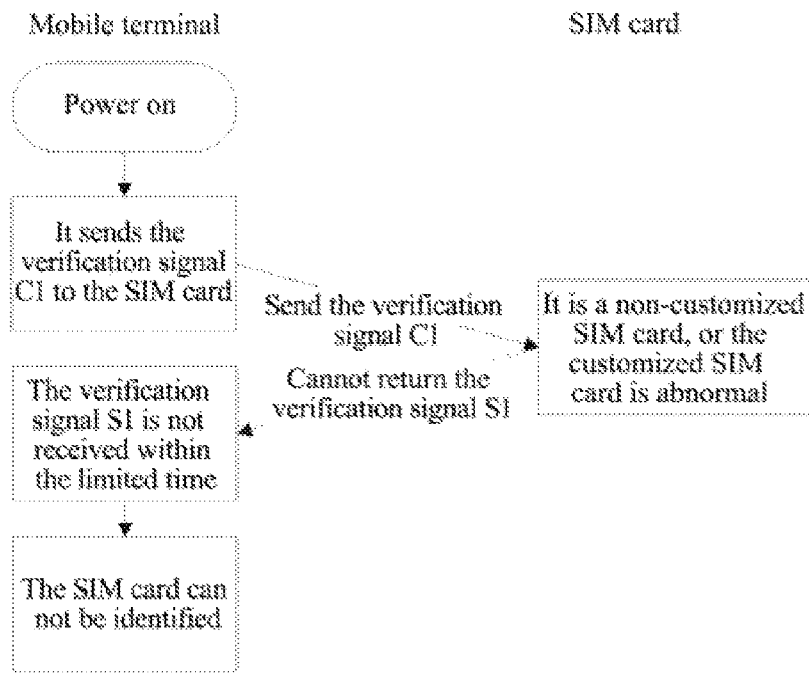
FIG. 2 (a)~(d) are four flow charts that the verification process performed by the mobile terminal and the SIM card fails in accordance with the present document.
Figure 2:
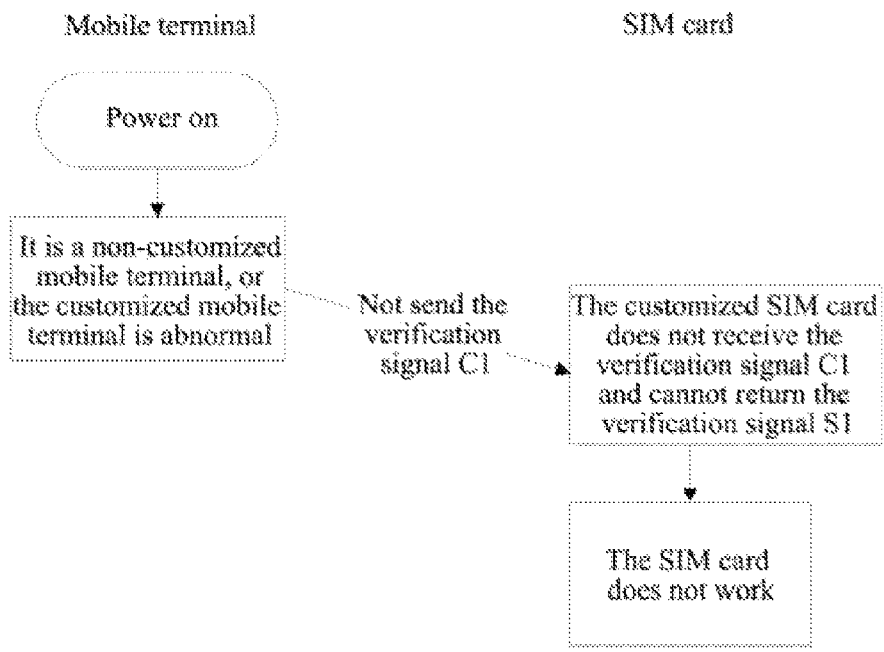
Figure 2:
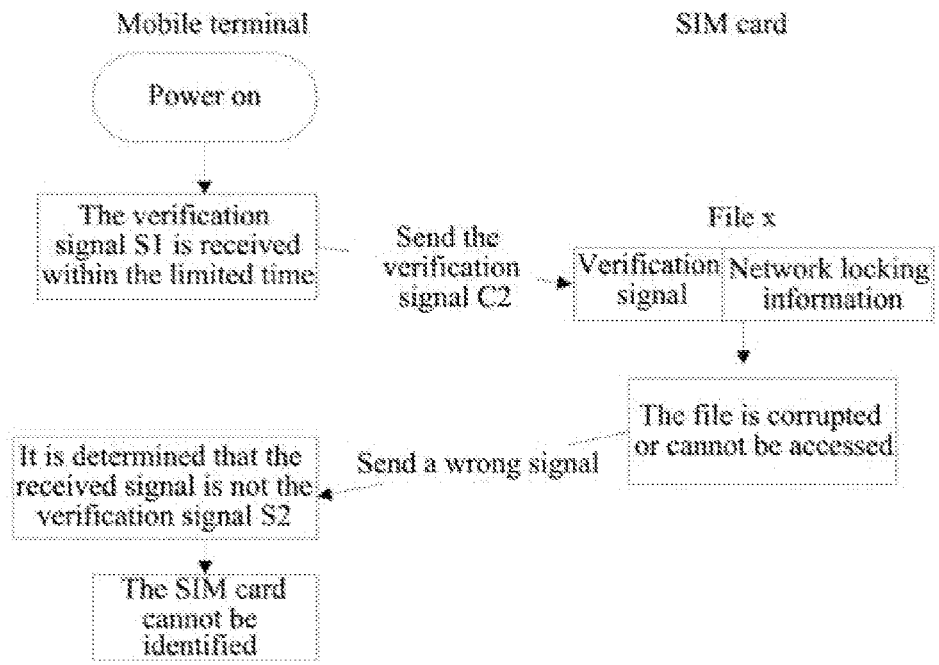
Figure 2:
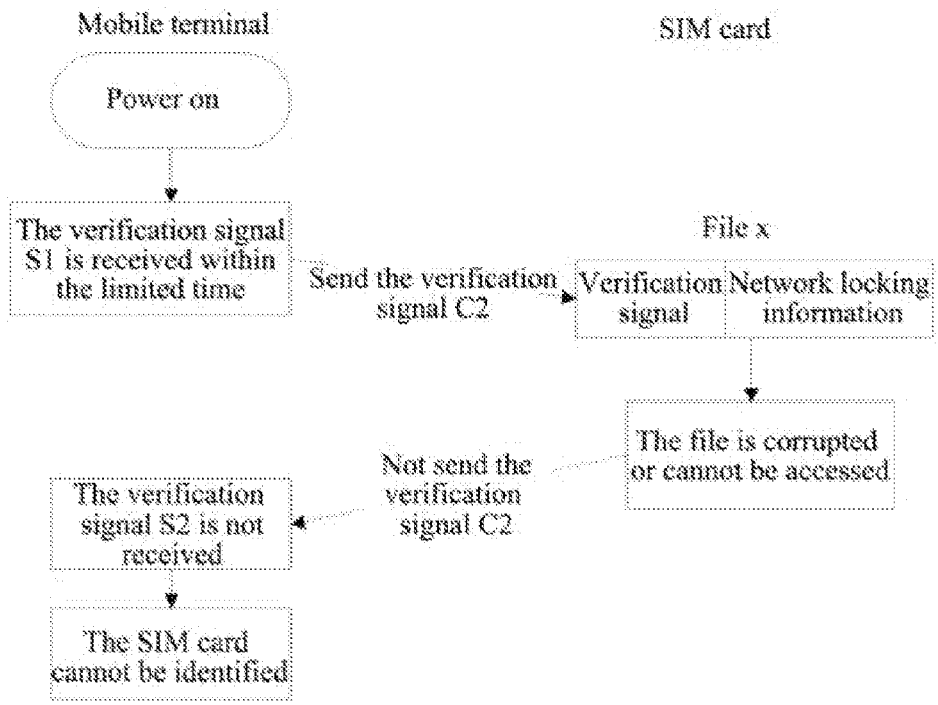

FIG. 2 (a)~(d) are four flow charts that the verification process of the mobile terminal and the SIM card fails in accordance with the present document, and as shown in FIG. 2, FIG. 2 (a) shows the case that a non-customized SIM card is inserted in a customized mobile terminal or the customized SIM card becomes abnormal, therefore, the SIM card cannot return the verification signal S1, and the mobile terminal displays that the SIM card is illegal, and the subsequent operation can not be performed; FIG. 2 (b) is the case that the mobile terminal in which the customized SIM card is inserted is a non-customized mobile terminal or the customized mobile terminal becomes abnormal, the mobile terminal cannot send the verification signal C1, and the customized SIM card does not receive the verification signal C1 and will not continue the subsequent process, therefore, it cannot return the verification signal S1; FIG. 2 (c) is the case that a customized SIM card is inserted in the customized mobile terminal, but the file in which the verification signal and the network locking information are stored in the SIM card are damaged, at this time, the SIM card returns a wrong signal, that is, the returned signal is not the proper verification signal S2, therefore, the customized mobile terminal does not identify the SIM card and does not continue the subsequent operation; FIG. 2 (d) is the case that a customized SIM card is inserted in the customized mobile terminal, but the fiel in which verification signals and the network locking information are stored in the SIM card are damaged, at this time, the SIM card does not send the verification signal S2, if the customized mobile terminal does not receive the verification signal S2, it identifies the SIM card as an illegal card, which will not work any more.

In Step 103, the mobile terminal compares the stored network locking information with that in the SIM card, and if the comparison result indicates consistency, the mobile terminal enters into the normal standby state; otherwise, the mobile terminal is not available;

Specifically, if the verification signal S2 returned by the SIM card is correct, the mobile terminal compares the network locking information in the SIM card with its own stored network locking information, and if the comparison result indicates consistency, namely, the network locking flags are the same, and both are not in the locking state, and the network locking MCC and MNC are consistent, the mobile terminal enters into the normal standby state; if any information in the network locking information of the both parties is inconsistent, it is indicated that the network locking information is abnormal, and the mobile terminal can not be used.

Herein, if the network locking flags of the mobile terminal and the SIM card are unlocking success state, that is, the mobile terminal and the SIM card are legally unlocked, and the mobile terminal also enters into the normal standby state.

Figure 3:
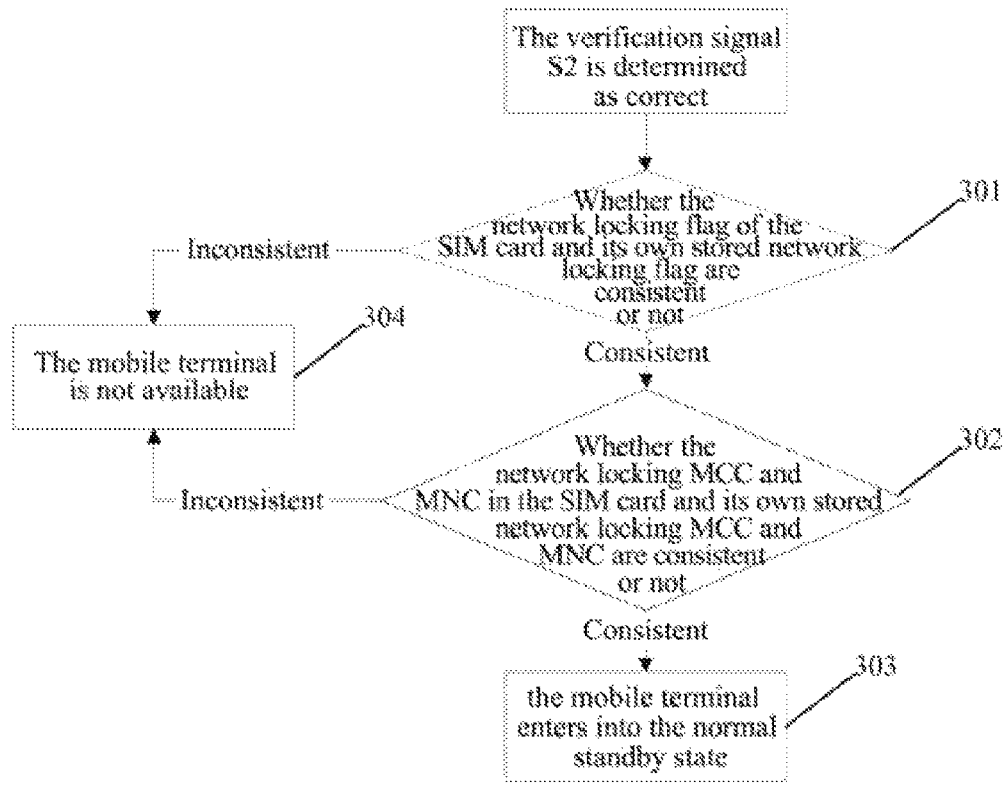
FIG. 3 is a flow chart of a network locking information comparison process in accordance with the present document.

FIG. 3 is a flow chart of the network locking information comparison process in accordance with the present document, and as shown in FIG. 3, it comprises the following steps:

In step 301, the mobile terminal judges whether the network locking flag of the SIM card and its own stored network locking flag are consistent or not, if they are consistent, it is to proceed to step 302; otherwise, it is to proceed to step 304, and the mobile terminal is not available;

In step 302, the mobile terminal judges whether the network locking MCC and MNC in the SIM card and its own stored network locking MCC and MNC are consistent or not, if they are consistent, it is to proceed to step 303; otherwise, it is to proceed to step 304, and the mobile terminal is not available;

In step 303, the mobile terminal enters into the normal standby state.

Herein, no matter whether the network locking information in the mobile terminal or the network locking information in the SIM card is modified or cracked, the comparison result indicates consistency, and the mobile terminal is not available, thus ensuring the security of the locked network.

Figure 4:
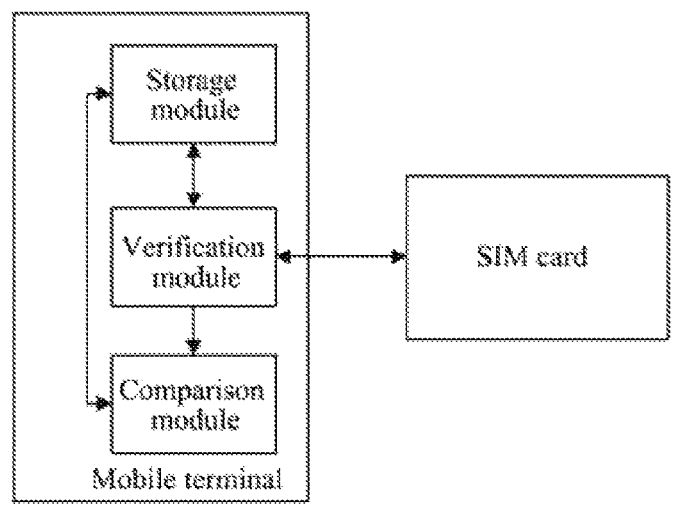
FIG. 4 is a structural diagram of a network locking device for a mobile terminal in accordance with the present document.

FIG. 4 is a structural diagram of the network locking device for the mobile terminal in accordance with the present document, and as shown in FIG. 4, the device comprises: the mobile terminal and the SIM card; wherein, the mobile terminal is used to store the network locking information and the verification signals for performing the verification with the SIM card; after the mobile terminal is powered on, verify with the SIM card each other through the verification signals, when it is determined that the both parties pass through the verification performed by the other party, compare the stored network locking information with that in the SIM card, and when it is determined that the comparison result indicates consistency, enter into the normal standby state;

the SIM card is used to store the network locking information and the verification signals for verification performed with the mobile terminal; and after the mobile terminal is powered on, verify with the mobile terminal each other through the verification signals.

The present document also provides a mobile terminal, and as shown in FIG. 4, comprising: a storage module, a verification module and a comparison module; wherein the storage module is used to store the network locking information and the verification signals for verification performed with the SIM card;

the verification module is used to, after the mobile terminal is powered on, verify with the SIM card each other through the verification signals in the storage module, and when it is determined that the both parties pass through the verification performed by the other party, notify the comparison module;

the comparison module is used to, after receiving the notification from the verification module, compare the network locking information stored in the storage module with that in the SIM card, and if it is determined that the comparison result indicates consistency, make the mobile terminal enter into the normal standby state.

The present document also provides a SIM card, which is used to store the network locking information and the verification signals for verification performed with the mobile terminal; after the mobile terminal is powered on, verify with the mobile terminal each other through the verification signals.

The above description is only preferred embodiments of the present document and is not intended to limit the protection scope of the present document.

What is claimed is:

1. A network locking method for a mobile terminal, comprising:
   pre-storing network locking information and verification signals in a mobile terminal and a subscriber identity module (SIM) card respectively, wherein two verification signals C1 and C2 are pre-stored in the mobile terminal, and the corresponding verification signals S1 and S2 are pre-stored in the SIM card;
   after said mobile terminal is powered on, said mobile terminal and said SIM card verifying each other through the verification signals, wherein said mobile terminal firstly sends the verification signal C1 which is a start-up signal of the SIM card to said SIM card, and after said SIM card receives the verification signal C1, said SIM card begins to work normally and returns the verification signal S1, otherwise, if said SIM card does not receive the verification signal C1, said SIM card does not work, and after said mobile terminal receives the verification signal S1, said mobile terminal sends the verification signal C2 to said SIM card, said SIM card correspondingly returns the verification signal S2, so as to implement the verification;
   if the both parties pass through said verification performed by the other party, said mobile terminal comparing the stored network locking information with the network locking information in said SIM card, and if a comparison result indicates consistency, said mobile terminal entering into a normal standby state.

2. The network locking method for a mobile terminal of claim 1, wherein, said mobile terminal and said SIM card verifying each other comprises:
   said mobile terminal actively sending the verification signal C1 to said SIM card, after said SIM card receives said verification signal C1, the SIM card returning the verification signal S1 to said mobile terminal;
   after said mobile terminal receives the verification signal S1, said mobile terminal sending the verification signal C2 to said SIM card; if said mobile terminal does not receive the verification signal S1, it being indicated that said SIM card is not legal and does not pass the verification performed by said mobile terminal;
   after said SIM card receives the verification signal C2, said SIM card returning the verification signal S2 to said mobile terminal, and returning network locking information stored in the SIM card to said mobile terminal; said mobile terminal first judging whether the received verification signal S2 is correct or not, if correct, it being indicated that the both parties pass through the verification performed by the other party; if not correct, it being indicated that the verification process by the both parties fails.

3. The network locking method for a mobile terminal of claim 2, wherein, said network locking information comprises: network locking flag, as well as network locking mobile country code (MCC) and mobile network code (MNC).

4. The network locking method for a mobile terminal of claim 1, wherein, said network locking information comprises: network locking flag, as well as network locking mobile country code (MCC) and mobile network code (MNC).

5. The network locking method for a mobile terminal of claim 4, wherein, said mobile terminal comparing the network locking information with the network locking information in said SIM card comprises:
   said mobile terminal first judging whether said network locking flag of said SIM card is consistent with the network locking flag stored in the mobile terminal itself or not, and if inconsistent, said mobile terminal being unavailable; if consistent, said mobile terminal judging whether said network locking mobile country code and mobile network code of said SIM card are consistent with the network locking mobile country code and mobile network code stored in the mobile terminal itself respectively or not; if consistent, said mobile terminal entering into a normal standby mode; if inconsistent, said mobile terminal being not available.

6. The network locking method for a mobile terminal of claim 4, wherein, said network locking flag comprises: active state, unlocking success state and locking state.

7. A network locking device for a mobile terminal, comprising: a mobile terminal and a subscriber identity module (SIM) card; wherein
   said mobile terminal is used to store network locking information as well as verification signals for performing verification operation with said SIM card, wherein two verification signals C1 and C2 are pre-stored in the mobile terminal; after said mobile terminal is powered on, verify with said SIM card each other through the verification signals, and if it is determined that both parties pass through the verification performed by the other party, compare the stored network locking information with that in said SIM card, and if it is determined that a comparison result indicates consistency, enter into a normal standby state;
   said SIM card is used to store the network locking information and the verification signals for performing the verification operation with said mobile terminal, wherein verification signals S1 and S2 corresponding to the C1 and C2 are pre-stored in the SIM card; after said mobile terminal is powered on, verify with said mobile terminal each other through the verification signals;
   wherein said mobile terminal firstly sends the verification signal C1 which is a start-up signal of the SIM card to said SIM card, and after said SIM card receives the verification signal C1, said SIM card begins to work normally and returns the verification signal S1, otherwise, if said SIM card does not receive the verification signal C1, said SIM card does not work, and after said mobile terminal receives the verification signal S1, said mobile terminal sends the verification signal C2 to said SIM card, said SIM card correspondingly returns the verification signal S2, so as to implement the verification.

8. A subscriber identify module (SIM) card, wherein, said SIM card is used to store network locking information and verification signals for performing verification operation with a mobile terminal; wherein two verification signals C1 and C2 are pre-stored in the mobile terminal, and the corresponding verification signals S1 and S2 are pre-stored in the SIM card;

after said mobile terminal is powered on, said SIM card is used to verify with said mobile terminal each other through the verification signals; wherein said mobile terminal firstly sends the verification signal C1 which is a start-up signal of the SIM card to said SIM card, and after said SIM card receives the verification signal C1, said SIM card begins to work normally and returns the verification signal S1, otherwise, if said SIM card does not receive the verification signal C1, said SIM card does not work, and after said mobile terminal receives the verification signal S1, said mobile terminal sends the verification signal C2 to said SIM card, said SIM card correspondingly returns the verification signal S2, so as to implement the verification.

* * * * *